Patented Feb. 20, 1934

1,947,717

UNITED STATES PATENT OFFICE 1,947,717

COCOA PRODUCT AND PROCESS OF MAKING SAME

John Harvey Kellogg, Battle Creek, Mich., and George L. Teller and William Kedzie Teller, Riverside, Ill., assignors to The Battle Creek Food Company, Battle Creek, Mich., a corporation of Michigan No Drawing. Application November 13, 1929 Serial No. 406,983

6 Claims. (Cl. 99—11)

Our invention relates to the art of preparing food products from cacao, the fruit of the *Theobroma cacao* and contemplates particularly the preparation of products such as are now generally designated by the term cocoa.

It has long been known that food products from this source such as cocoa, chocolate and the like, contain considerable amounts of alkaloids the principal among which is theobromine or 3.7-dimethyl xanthine. The effect of this substance upon the human system when taken internally is well known to be injurious. For this reason various attempts have been made to remove theobromine without destroying the flavor of the cocoa or removing the desirable components of the food. These, however, have been far from successful. In some cases the investigator has failed to realize that theobromine exists in cacao products not only in the free state but also in the combined state and while the exact composition of this compound is not known we are inclined to believe that the combined theobromine exists as a glucoside. While these investigators have probably removed only the theobromine existing in the free state at the time of treatment, a further amount of this compound would be liberated from the combined state due to hydrolysis and the law of mass action. Therefore, without a proper treatment of the cacao products to complete this hydrolysis, all of the alkaloid could not be removed by the methods employed.

We have aimed to provide a process for the removal of alkaloids from cacao products and the like by relatively simple and easily performed steps.

Another object of our invention is the provision of an improved process whereby substantially all of the alkaloid is removed from the food products without materially affecting the flavor and the food value thereof.

We have also aimed to provide a process of this character whereby the fats normally contained in food products of this character are not removed to any appreciable extent.

A still further object of the invention is the provision of a process wherein the combined alkaloid is liberated from its combined state and removed from the food.

Another and important object of the invention is to provide a substantially alkaloid free food product.

Our process consists in a general way of treating cacao products, such, for example, as cocoa or chocolate, with a dilute solution of a suitable alkali to cause hydrolysis of the theobromine-containing compounds, the presence of the alkali resulting in the fact that the originally free and the split-off theobromine are highly soluble in the solution. The dilute solution of the suitable alkali should be a selective solvent which will remove the theobromine and not dissolve any substantial amount of the fat-free ingredients and preferably not any substantial amount of the fat of the cacao. The residue is separated from the mixture by decantation, filtration, or other suitable means and washed to remove the remainder of the extraction solution.

In carrying out our process we first prepare a selective solvent of suitable properties. When working with powdered cacao products such as the ordinary commercial cocoa powder a mixture of a suitable alcohol and water may be employed. We have found, for example, that commercial methyl alcohol, having a concentration of about 99 percent, when diluted with water to form a mixture of about 90 percent methyl alcohol and 10 percent water proves to be an excellent solvent. To this mixture we add sufficient caustic alkali as, for example, potassium hydroxide to form a one-half normal caustic solution based upon the total liquid present. This means that the mixture of alcohol and water should contain 28 grams of potassium-hydroxide per liter. This alcoholic caustic is added to powdered cacao products in the ratio of about three times as much caustic alcohol as powder. The mixture is agitated for a period of about one and one-half hours at normal atmospheric temperature, after which the mass is filtered through a filter press of ordinary design. The solids are then washed with a 90 percent solution of methyl alcohol until the washed solution is substantially free from theobromine. The amount of alkali remaining in the residue from the first extraction makes the subsequent wash alcohol sufficiently alkaline to dissolve the theobromine readily during washing. The mass of solids may then be dried by any of the well-known methods. We have found it to be particularly advantageous to dry the mass in a vacuum at a temperature of about 50° C. though the exact temperature is not important so long as the cake is not burned or caramelized.

Two examples are given below showing how we have actually performed the process and how others may perform it in accordance with this invention.

*Example No. 1*.—25 parts of cocoa and 200 parts of a 90% solution of methyl alcohol containing sufficient potassium-hydroxide to give the solution an alkalinity of ½ normal, were agitated for two hours. The mixture was then filtered and the cake washed with 200 parts of 95% methyl alcohol. The cake was dried in a vacuum drier at 50° C. and pulverized. The theobromine content based on the fat free cocoa was 2.62% before treatment and 0.10% after treatment.

*Example No. 2.*—100 parts of cocoa and 300 parts of the alcohol solution employed in Example No. 1 were agitated for one and one-half hours. The mixture was filtered and the cake washed with 90% methyl alcohol. The cake was dried in a vacuum drier at 50° C. The theobromine content based on the fat free cocoa was 2.60% before treatment and 0.08% after treatment.

The theobromine content was determined by the method of Raymond V. Wadsworth, as set forth in Analyst 42, 32–7 (1921).

The alcohol employed may be recovered by suitable distillation methods leaving a residue of alkaloid, alkali and fat. The residue may be treated by any of several well-known methods to separate the alkaloid from the fats for commercial use.

We have observed that methyl, ethyl and isopropyl alcohols may be employed in the solvent and we are confident that any of the lighter mono-hydroxy paraffin alcohols may be employed for the purpose. Among other things acetone may be employed for the purpose but it is thought to be not so satisfactory as the alcohols above mentioned because of the difficulty of removing the last traces from the food. One of the functions of the alcohol is to retard the solution in the water of those components of the cocoa which are normally soluble in water and which it is desired to retain in the cocoa. Also the originally free and split-off theobromine which have been made readily soluble must be soluble in the mixture of alcohol and water. Any solvent which is capable of performing these functions may be used. The concentration of methyl alcohol while it need not be exactly 90 percent, should be in this region. If the concentration is increased beyond this point the amount of theobromine extracted in proportion to the amount of solvent becomes less and, on the other hand, if the concentration is decreased the solvent tends to dissolve too much of the water soluble components of the cocoa. Thus the exact concentration to be employed is a matter of some discretion and must be arrived at by a compromise between these two factors.

While any alkali or any alkaline earth hydroxide may be used, it is believed to be particularly advantageous to employ the caustic alkalies of which sodium and potassium, being the most abundant, are preferred. It is our belief that the functions of the alkali are to hydrolyze the theobromine-containing compound and to react with the free theobromine to form the more soluble alkali derivative thereof. The sodium and potassium alkalies are also to be preferred because they do not tend to form insoluble compounds, which are undesirable since they are retained with the solid food portion of the cocoa upon filtration. While all of these alkalies may be used to a certain extent the stronger and more soluble sodium and potassium hydroxides are to be preferred. The concentration of alkali which may be employed is subject to considerable variation. In general the solubility of theobromine increases with the concentration of the alkali solution. It will be seen that if the alkali is too dilute a much larger volume of solvent will be required to extract the theobromine completely.

On the other hand when the concentration of alkali is too great there is a tendency to rapidly saponify the fat contained in the cocoa products. The higher concentrations of alkali also have a tendency to destroy the flavor of the finished product by removing larger amounts of fats, tannins, and the like, thus materially affecting the quality of the product. Here again a compromise between these two factors is required, and we have found by experiment that a one-half normal solution is sufficiently rapid to bring about the desired results without the use of too large a volume of solution.

The time required for the agitation period varies greatly depending upon the fineness of the cocoa products, upon the concentration of the alkali, and upon the character of the solvent employed. Excessive agitation should, however, be avoided since it tends to cause increased saponification of the fat and removal of the flavor. The agitation should only be continued, until hydrolysis is substantially complete.

While the temperature of the mixture during agitation does not appear to be important, a range of 20° C. either way from room temperature apparently being useable, excessive temperatures should be avoided since they tend to expand the starch cells and promote excessive hydrolysis thereof. The expanded starch cells become gelatinous and cause filtration difficulties.

The solvent may be removed from the residue in any well-known method as, for example, by decanting the solvent off or by passing the mixture through a filter press, the latter being preferable since a more complete separation is thereby attained. In order to remove the solvent remaining and theobromine contained therein the filter press cake is washed with a 90 percent solution of alcohol containing no alkali. In this wash the remaining theobromine and the greater portion of the alkali is removed from the cake. Theoretically the washing should involve only the removal of the last traces of the extracting solution since the theobromine is presumed to be all in solution at this point, and it will be found as a matter of fact, that only a very small amount of wash solution need be used. The washing may be carried on at any suitable temperature, as, for example, that employed in the original agitation.

While any of the well-known methods of drying may be used to remove the solvent from the cake we believe that it may be advantageously dried in a vacuum drier by which method a slightly better flavor is obtained.

It should now be apparent that we have provided a new and highly novel process and product resulting therefrom. The process results in the removal not only of the free theobromine but also of the combined alkaloid. The fats normally present in this type of food are left intact and no substantial amount of them are removed if the process is performed in the preferred manner as above described. The flavor of the product is not affected in any appreciable degree.

While we have thus described a particular embodiment of our invention we are aware that numerous changes and alterations may be made in the process without materially departing from the spirit of the invention or from the results obtained thereby and we do not wish to be limited except as required by the prior art and the scope of the following claims in which—

We claim:

1. The process which includes the treatment of natural theobromine containing products with a reagent including a lower mono-hydroxy paraffin alcohol, an alkali, and water, separating the liquid from the remaining solids, and washing the separated solids.

2. The process for extracting alkaloids from cacao products which includes the steps of treating the cacao products with a single reagent consisting of a hydrolyzing agent, water, and an organic solvent for said alkaloids simultaneously hydrolyzing the combined alkaloids and selectively dissolving the alkaloid without materially dissolving other ingredients of the cacao products, separating the solution from the residue, washing the separated residue until substantially free from alkaloid, and drying the residue to produce a food product.

3. The process for extracting alkaloids from cacao products which includes the mixing thereof with a solvent solution containing a light alcohol of the paraffin series, water and caustic alkali, agitating the mixture until hydrolysis of the theobromine containing compounds is substantially complete, separating the solvent from the residue, and washing the residue with a mixture of said alcohol and water until the wash solution shows no substantial amount of theobromine.

4. The process set forth in claim 3 wherein the washed residue is dried to remove the solvent and pulverized to provide a food product.

5. The process for extracting alkaloids from cacao products which includes mixing said products with a combined solvent and hydrolyzing agent including a concentrated light alcohol of the paraffin series having dissolved therein a small proportion of caustic alkali and water, agitating the mixture until hydrolysis is substantially complete, separating the solvent from the residue, washing the residue with said solvent solution containing no alkali, and drying said residue in a vacuum drier at a temperature sufficiently low to prevent burning or caramelizing thereof.

6. The process for preparing cacao products which includes mixing said products with a reagent including in the region of 90% of mon-hydroxy paraffin alcohol having no more than three carbon atoms, and sufficient water to make 100% to which has been added sufficient caustic alkali to form ¼ to 1 normal solution thereof based on the total liquid, said mixing to be carried out at a temperature below the burning point of the cacao products until the theobromine containing compounds have been substantially hydrolyzed, separating the reagent from the residue, washing the residue with a solution of about 90% of said alcohol in water until the wash is substantially free from theobromine, and drying and pulverizing the residue.

JOHN HARVEY KELLOGG.
GEORGE L. TELLER.
W. KEDZIE TELLER.